Nov. 19, 1963   B. K. JAQUITH   3,111,113
FLUID MOVEMENT CONTROL MECHANISM
Filed Oct. 31, 1960   3 Sheets-Sheet 1

*INVENTOR*
BURTON K. JAQUITH
BY
*ATTORNEY*

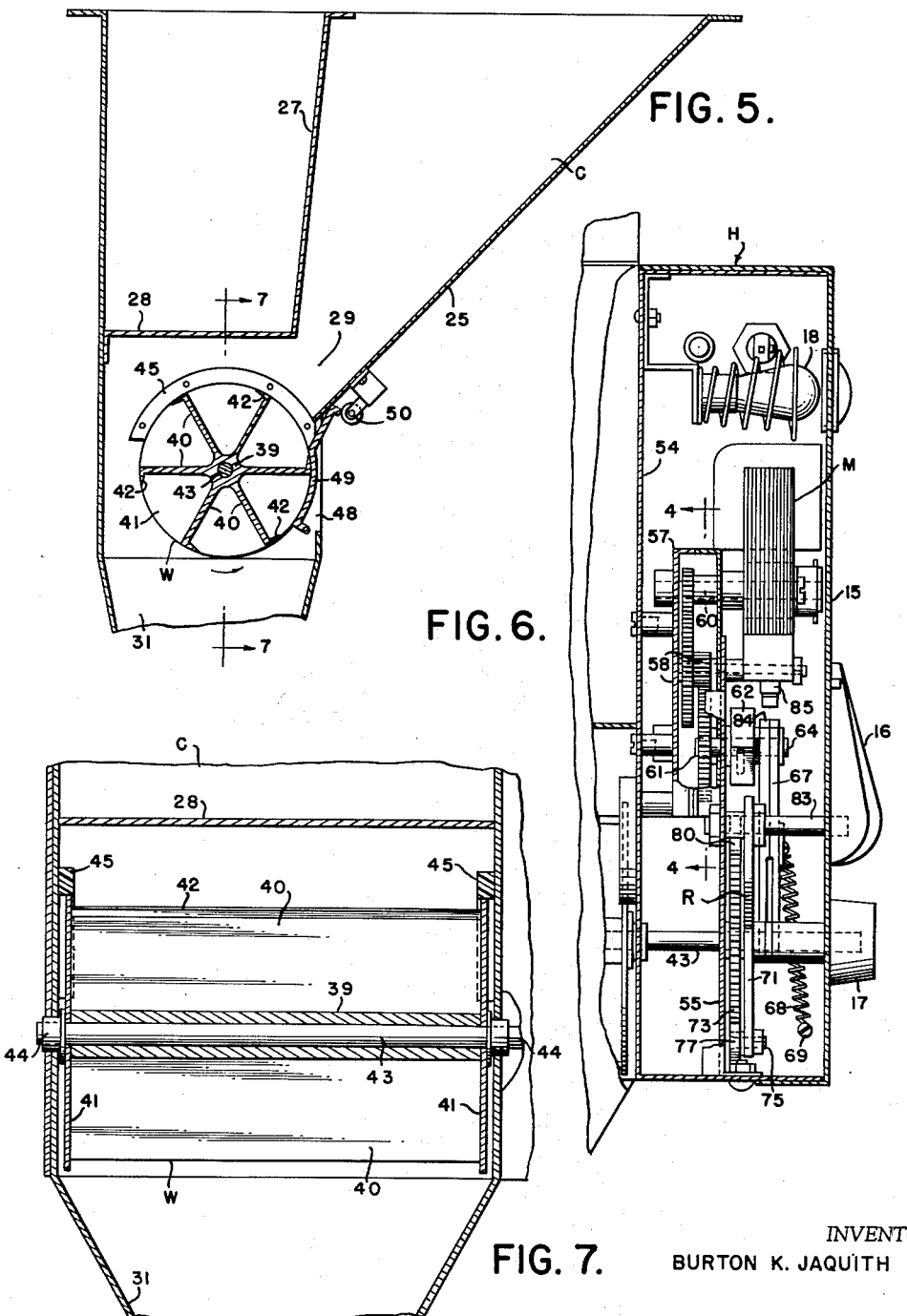

Nov. 19, 1963  B. K. JAQUITH  3,111,113
FLUID MOVEMENT CONTROL MECHANISM
Filed Oct. 31, 1960  3 Sheets-Sheet 3
FIG. 8.
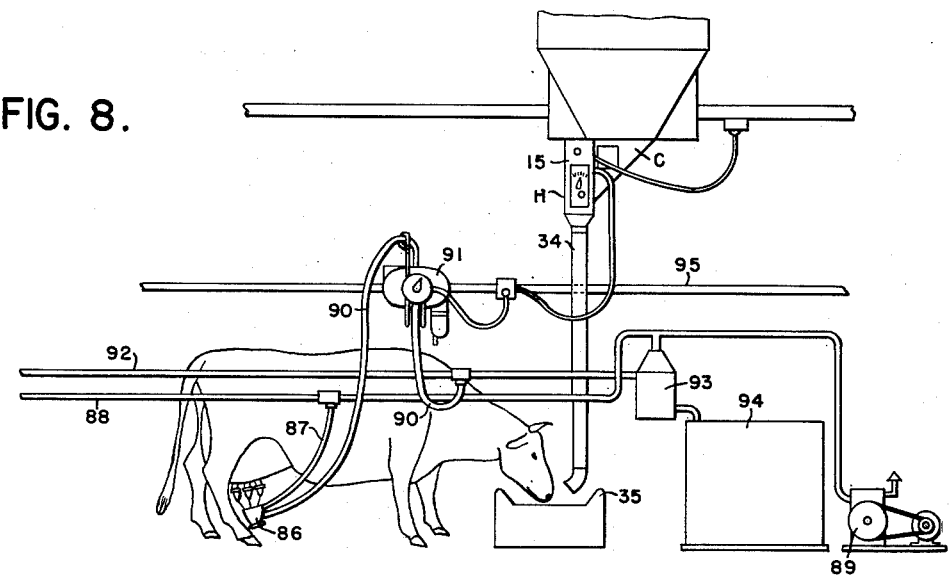
FIG. 9.
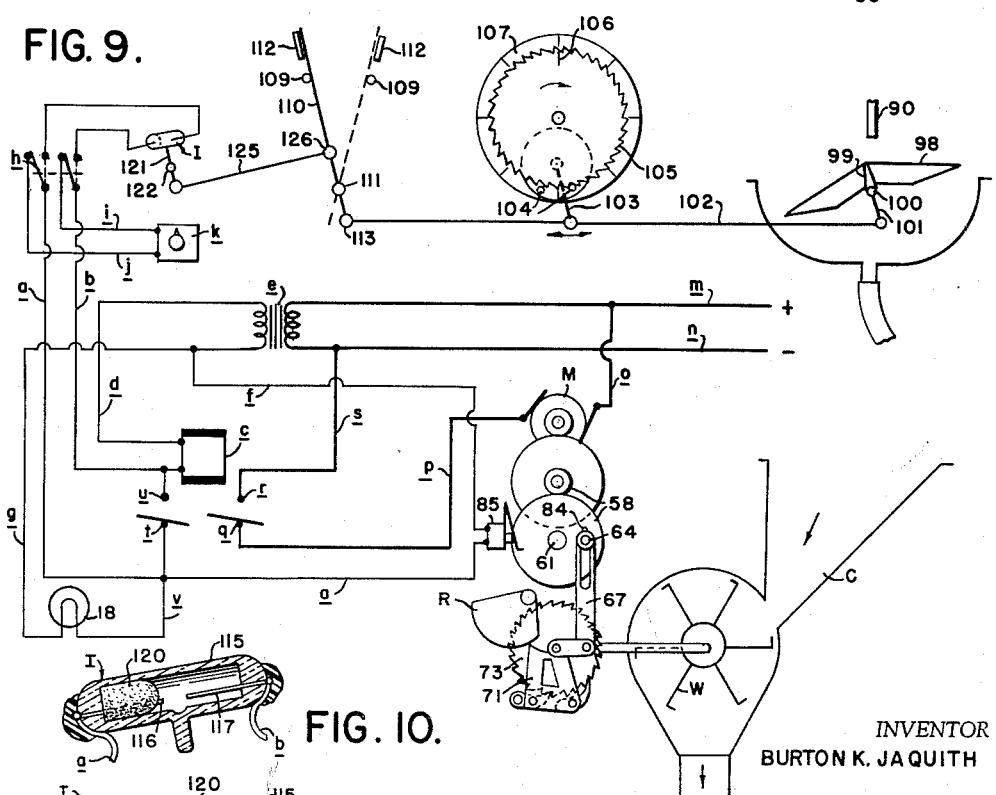
FIG. 10.
FIG. 11.
INVENTOR
BURTON K. JAQUITH
BY *Ephraim Banning III*
ATTORNEY

United States Patent Office 3,111,113
Patented Nov. 19, 1963

3,111,113
FLUID MOVEMENT CONTROL MECHANISM
Burton K. Jaquith, Fort Lauderdale, Fla., assignor to Technical Industries, Inc., Fort Lauderdale, Fla., a corporation of Florida
Filed Oct. 31, 1960, Ser. No. 66,097
25 Claims. (Cl. 119—14.17)

This invention relates to a means for handling flowable material within a conduit system therefor, by separating the material into uniform increments of predetermined amount and advancing all such increments processionally to a point of discharge. It is concerned also with a means and method for utilization of impulses, resulting from conversion of a continuous stream, variable or otherwise, of flowable material into a succession of separated increments thereof, to measure the amount of such material passing through the conduit system therefor and/or control the operation of a feeding mechanism for a second conduit system through which flowable material, derived from a different source, is adapted to be processionally advanced in the form of separated increments.

While my invention may find useful application in various industries engaged in handling flowable materials of many different kinds, it has been designed for and successfully used in the dairy industry to supply feed to production cows concurrently with milking operations, the quantity of such feed being adjustable relative to the milk yield, in a desired ratio, in each case. Stated differently, the feed supplied to each cow is in a quantity that is in direct proportion to her concurrent milk production. By adopting a basic ratio of feed to milk production, with provision for variations to meet special conditions, a large number of producing cows may be assured of receiving feed in an amount best suited for the requirements of each individual cow, concurrently with each milking operation, and with a minimum of effort and of wastage.

The word "feed" as used herein, includes food concentrates, grain supplements, rations, etc.—all loose material which is flowable through a conduit system to be handled mechanically therein. Likewise, "fluid" is to be construed as any material, liquid, granular, loose feed, or otherwise, which is flowable or in a flowable state, so as to be subject to treatment by the several agencies in the manner hereinafter noted. The term "continuous" or its equivalent as used herein in reference to flowing material, is to be understood as not limited to, but including, a stream whose movement is somewhat variable as to velocity and quantity, as in the case of milk proceeding from the udder of a cow through a conduit therefor to a desired destination.

Since the output of producing cows is widely variable, the amount of feed supplied to each individual cow should also vary somewhat correspondingly, otherwise the amount may be too much or too little. The simplest way is to relate the feed input to the milk output according to some established basic ratio, but to date this has not been successfully done by automatic means. By the means and method herein to be disclosed, these objectives are attained successfully and dependably, with provision also made for varying the basic ratio when reasons exist for doing so.

So that the feed delivery operation may be linked to the output of a producing cow, I provide means for separating such output into uniform increments, each creating an impulse which, when transmitted to the feed delivery mechanism, will initiate a concurrent operation therein to separate the feed within its conduit system into a like number of uniform increments for sequential advance to the cow to be eaten while milking proceeds. The total milk yield is variable between different cows, and at different times for the same cow, so that the increments of milk in one system and of feed in another system should desirably be correspondingly varied. The amount of feed to be comprised in each increment thereof (which may be varied for optimum results as hereinafter to be disclosed) is predetermined so that the total amount of feed delivered to the cow will be directly proportionate to her output of milk. This feature of utilizing a variable number of increments in a control system, each transmitting an impulse to the other system to produce a like number of increments, all averaging uniformity as to amount but presumably different from the amount contained in the increments in the control system, is basic to the present invention as is also the means whereby to predetermine the amount of feed entering into each increment in the main system with which we are primarily concerned in this application.

Other objects and advantages will become apparent as the description proceeds. These include an electrical system interconnecting the two conduit systems, with main (high voltage) and control (low voltage) circuits, the latter alone leading to exposed points for push-in and pull-out connections thereto; an impulse switch of special construction by which to momentarily close the control circuit for energization of a relay in connection with the main circuit to supply current to a motor for operation of the feed delivery mechanism; supporting means for the impulse switch by which to produce rocking movements thereof in response to advance of each milk increment within the conduit system therefor; a double pole time switch interposed in the control circuit so as to cut out the impulse switch when energization of that circuit for a predetermined period of time is desired; a drive from the motor to the feed delivery mechanism having adjustable means for determining the extent of the latter's operating movement, and, in consequence, the amount of feed in each increment advanced thereby; and an effective assembly of the motor and drive into a power pack enclosed within a protecting housing, with controls therefor arranged conveniently upon the exterior thereof.

These various objectives, and others to be hereinafter noted, may all be realized from the present invention of which a suggestive embodiment is illustrated in the accompanying drawings in the manner following:

FIG. 5 is a detail in vertical section, drawn to an enlarged scale, taken on line 5—5 of FIG. 2, showing the delivery of the wheel at the base of the chute by which to convey loose feed therefrom.

FIG. 6 is a vertical section taken through the housing, taken on line 6—6 of FIG. 3.

FIG. 7 is a detail of the feed delivery wheel in longitudinal section, taken on line 7—7 of FIG. 5 and drawn to an enlarged scale.

FIG. 8 is a diagrammatic view, drawn to a reduced scale, in which the present feed delivery mechanism is operatively linked to a milking machine conduit system.

FIG. 9 is a schematic view thereof including a diagrammatic showing of the electrical system employed for linking operation of the feed delivery mechanism to the flow of milk through the conduit system of a milking machine.

FIGS. 10 and 11 are details in longitudinal section of the special impulse switch comprised in the control circuit, the switch being shown in open and closed positions, respectively, in these two figures.

Figure 1:
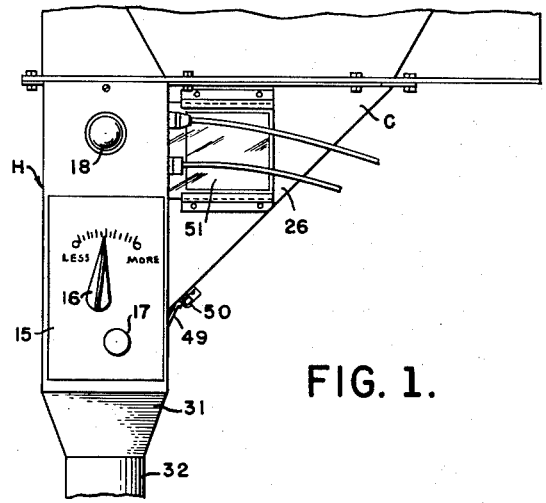
FIG. 1 is a front elevation of the housing for the power pack and feed delivery mechanism, showing also the chute extending laterally therefrom, with parts of the housing broken away.
Figure 2:
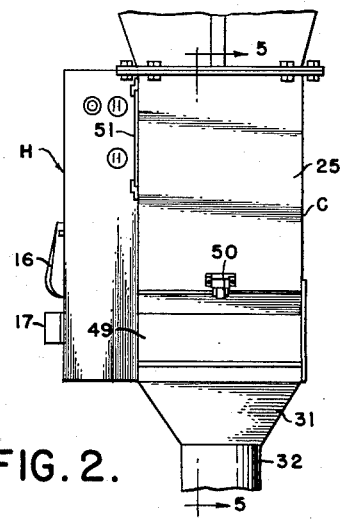
FIG. 2 is a side elevation thereof.
Figure 3:
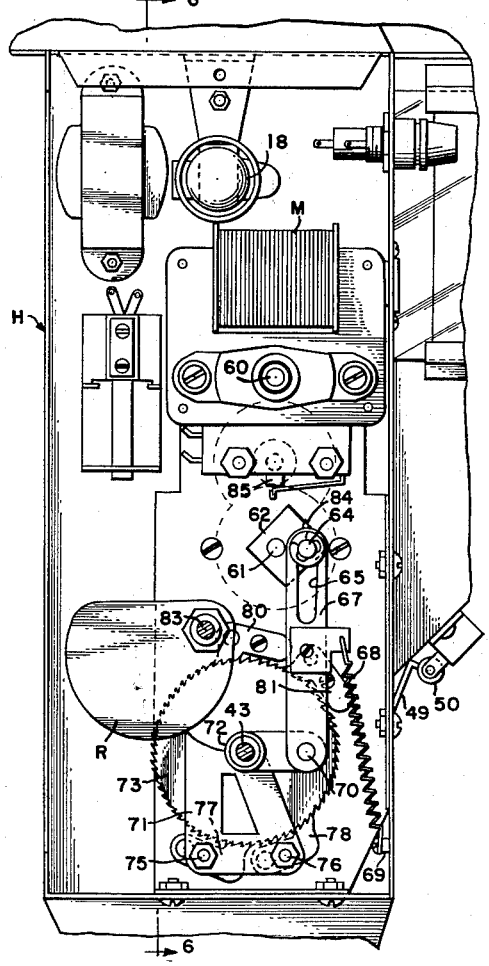
FIG. 3 is an elevation of the power pack and delivery mechanism drawn to an enlarged scale, as they appear when the protecting cover is removed from the front of the housing.
Figure 4:
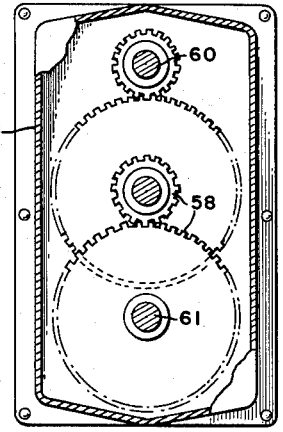
FIG. 4 shows the assembly of reduction gears, drawn to an enlarged scale, as contained within the casing therefor, the view being a section taken on line 4—4 of FIG. 6.

As herein shown, all electro-mechanical units are carried within a vertically elongated housing H to the front face of which is affixed a removable cover 15 (see FIG. 1). Upon the outer face of the cover is a pointer 16 rotatable adjacent a series of dial markings, such as the FIGURES 1 to 9, for example, a rotatable control knob 17, and an operating-indicating light 18, all having operative connections to the power pack or electrical system within the housing.

The Feed Conduit System

Affixed to one side of the housing H is a feed chute C having an angular wall 25 extending from a relatively low point thereon, both upwardly and outwardly, to a point about even with the top of the housing, the chute thus formed being closed at opposite ends by triangular walls 26. A generally vertical partition 27 within the chute, extending downwardly and toward its angular wall 25 and then horizontally away therefrom at 28, cooperates in defining a narrowing feed supply space terminating in an elongated throat 29 through which the feed is gravity impelled when drawn therethrough and into an elongated, segmentally compartmented, delivery wheel W which is rotatably mounted at the base of the chute below the horizontal wall 28 therewithin. Below the delivery wheel W is an adaptor fitting 31 joined to the walls of the chute to provide therebelow a neck 32 to which may be connected the upper end of a delivery spout 34 (see FIG. 8) extending downwardly to discharge feed therefrom into a pan 35 arranged conveniently to the cow when occupying a stall in the conventional milking parlor. The housing H and chute C are desirably supported from the ceiling of the milking parlor, in position for its chute to receive a constant feed supply, as by gravity from a bin, or otherwise from a conveyor.

Referring to FIGS. 5 and 7, the delivery wheel W comprises a hub 39 from which uniformly spaced walls 40 are radially extended, together with circular end walls 41 joined to the radial walls to provide therewith a plurality of segmental compartments of uniform capacity. The outer edge of each radial wall 40 carries a lip 42 facing forwardly with respect to the direction of wheel movement, as indicated by the arrow in FIG. 5, the purpose being to facilitate its movement into the body of the material to be scooped into the proximate wheel compartment for conveyance thereby to a position for gravity discharge therefrom.

Extending axially through the hub 39 is a shaft 43, in driving connection therewith, having opposite end portions journaled for rotation within bearings 44 that are carried by opposite walls of the housing H (see FIG. 7). To prevent leakage of feed past the wheel end walls 41, flanged arcuate moldings 45 may be affixed to the proximate chute walls 29 in position to closely overlie the peripheries of the end walls 41 through a substantial distance in their upper end portions (FIG. 5). The chute wall 29 which is vertically disposed immediately below the angular wall 25 and oppositely of the delivery wheel W is cut away to provide an elongated access opening 48 of substantial area. This opening is normally closed by a cover 49 of arcuate contour corresponding to that of the wheel end walls 41, so as to occupy a position closely adjacent the wheel while remaining free of engagement therewith. The cover 49 is desirably held in this closed position as by a spring hinge mounting 50 on the chute, permitting it to be swung out and away from the delivery wheel W to afford ready access thereto for cleaning or other purposes. A sight glass window 51 in one of the end walls 26 of the chute affords a view of conditions interiorly thereof, so that an attendant may tell at a glance whether feed is moving properly therethrough.

The Power Pack

Within the housing H is a pair of spaced vertical mounting plates 54 and 55 for support by one or both of them of an electric motor M having an associated casing 57 for accommodating a train 58 of reducing gears (see FIG. 4) operatively connected to the motor shaft 60. The driven shaft 61 of the last gear in the train 58 is extended through the casing 57 exteriorly thereof to drive a disc 62 whereon is eccentrically carried a pin 64 in sliding connection with an elongated slot 65 formed in the upper end portion of a depending link 67. An elongated coiled spring 68 extends between a lug on the link and an anchoring screw 69 on a wall of the housing H for biasing the link downwardly so that the eccentric pin 64 will tend to engage the upper end of the slot 65, while permitting the link to move upwardly relatively thereto in response to a force counter-balancing that of the spring 68. The lower end of this link is pivotally connected at 70 to one end of a pawl carrier 71 in the form of a plate having a hub 72 mounted freely upon one end portion of the shaft 43 to which a ratchet wheel 73 is also affixed, the shaft being axially extended beyond the delivery wheel W into the housing H for this purpose (FIG. 5).

The carrier 71 provides pivotal mountings 75 and 76 for duplex gravity feed pawls 77 and 78, respectively, both in engagement with the teeth of the ratchet wheel 73 to impart thereto a step by step, one-way movement. Another pair of gravity stop pawls 80 and 81, pivotally supported in fixed axial positions from the mounting plate 55, also engages the teeth of the ratchet wheel to prevent reverse movement thereof. A ratio cam R having a working face of gradually increasing radius, is carried fast on a shaft 83 above the wheel 73 and positioned for engagement with the carrier 71 at a point remote from its pivotal mounting to swing the carrier to a selected position counter to the tension of the spring 68 whose force is transmitted through the link 67 to maintain the carrier in engagement with the ratio cam R at all times. The carrier hub 72 is extended axially through the cover 15 to carry fast on its outer end portion the knob 17, thereby affording a convenient means for manual rotative adjustments of the ratchet wheel 73.

The cam shaft 83 which is extended through the housing front cover 15, carries fast on its outer end portion the pointer 16 by which it may be manually adjusted to a desired rotative position. If the ratio cam be adjusted to the point that the carrier 71 causes the link 67 to occupy a fully down position, as in FIG. 3, its ensuing working stroke will be the maximum so that the extent of one-way rotative movement imparted by one of the feed pawls to the ratchet wheel 73 will also be greatest. Should the ratio cam be adjusted otherwise, however, so that the working stroke of the link is somewhat less than the maximum, the extent of rotative movement imparted to the ratchet wheel will be correspondingly reduced. The control exercised by this ratio cam is therefore such as to provide for infinite variations in the extent of rotative movements of the ratchet wheel 73 in response to successive lifting movements of the link 67, and this is an important advantage in the operation of the present feed delivery mechanism.

Rotation of the delivery wheel W may require power sufficient to overcome a substantial resistance, particularly if the feed should tend to become clogged during its movement out from the chute. For this reason, the ratchet mechanism should be amply strong. This comment applies especially to the teeth of the ratchet wheel which should not be too small or spaced too closely together. With large coarse teeth, however, the pawls may have to advance idly a distance nearly equal to the length of each tooth before engaging its end shoulder, thereby involving a substantial lost motion which is objectionable. To obviate this difficulty, I employ duplex feed and stop pawls whose acting ends are spaced apart a distance equal to a selected multiple of the length of each tooth, plus one-half the length of a single tooth, thereby reducing by one half the lost motion that would otherwise occur.

From the preceding description it will be apparent that the mechanism contained within the housing H will be operative through the motor M, when energized, to slowly rotate the disc 62 whereby to lift the link 67 through a predetermined movement ranging from a full stroke to one that is nearly zero, to advance the feed pawls through a proportionate distance to impart a forward rotative movement to the ratchet wheel 73 and the delivery wheel W driven thereby. In so doing, the delivery wheel receives into one or more of its segmental compartments, depending upon the extent of its rotative movement, feed in an amount no greater than the capacity of such compartment or compartments, to be carried through a circular path extending from the throat 29 of the chute over the top of the wheel W and downwardly to the adaptor fitting 31 where it is freed for gravity discharge into the spout 34. The feed delivery is accurately controlled as to amount by the distance through which the wheel W is rotatively advanced during each such operation, and this distance is predetermined by (1) the setting of the ratio cam R as heretofore noted, and by (2) stopping all operations of the power pack at the completion of the cycle, as by a boss 84 on the upper end of the link 67 advancing into engagement with the movable arm of a micro switch 85 to trip the same to open position, thereby to deenergize the motor M, as will be more fully explained at a later point herein.

The Milk Conduit System

An approved means by which to measure the output of a cow's milk during a milking operation is now in wide spread use. Special advantage may be attained by linking operation of the present feed delivery to some such measuring mechanism so that the amount of feed to be released to the cow, while in the milking stall, may be proportionate to and concurrent with her milk production. This phase of my invention will now be described in detail.

Referring now to FIGS. 8 and 9, these diagrammatic and schematic views illustrate a conventional milking system comprising a claw 86 having teat cups applicable to the udder of a cow and provided with a flexible tubular connection 87 leading to the air line 88 and the usual vacuum pump 89; also a flexible tube 90 leading to the housing 91 of the measuring mechanism which is interposed in the milk line 92 leading to a releaser 93 (for separating air from the milk) en route to the tank 94 wherein the accumulating milk is refrigerated and stored. The housing 91 may conveniently be supported upon one of the usual installations 95, stanchions or otherwise, that are common to milking parlors.

The mechanism by which the yield of milk is measured continuously is the subject of my application for patent filed January 9, 1957, under Serial No. 633,287, now Patent No. 2,998,722. As here shown schematically, it utilizes an elongated tray 98 formed with a center cross partition 99 to provide two like compartments each open at the end which is opposite the other. Such a tray is symmetrical in that its two end portions, oppositely of the center partition 99, are alike in form, size and weight. The tray is mounted fast upon a rocking shaft 100 with its center of gravity disposed vertically above the shaft axis only when the outer ends of the tray compartments are tangential to a common horizontal plane. In all other positons, as when the shaft 100 is rocked in either direction, the imbalance of tray weight is shifted to one side or the other of a vertical plane intersecting the shaft axis. In effect, the tray is a poised scale receiver whose rocking movements are responsive to a shifting imbalance.

Desirably the tray is formed of some such material as methyl methacrylate polymer which is readily cleaned and sanitized, and which is light in weight whereby to minimize the factor of inertia which is inescapably present in each rocking operation.

A crank arm 101 extended fast from the shaft 100 is in pivotal connection with one end of a link 102 to transmit reciprocable movements thereto. This link operates a counter mechanism through pivotal connection with one end of an arm 103 for rocking a pair of pivotally mounted duplex pawls 104 alternately engageable with a ratchet wheel 105 whereby to impart thereto a step by step, one-way rotative movement. A pointer 106 on the ratchet wheel is moved through a circular path adjacent a coaxial dial plate 107 having uniformly spaced markings to indicate cumulatively the amount (desirably by weight) of milk passing through the conduit to the storage tank 94. Also a magnet arm 110 is pivotally mounted at 111 to oscillate between a pair of fixed stops 109 when operated by the reciprocating link 102 to which it is pivotally connected at 113. Permanent magnets 112 are also mounted adjacent the stops 109 with provision for independent adjustment toward and from the magnet arm 110 so as to vary the air gap therebetween when the arm is swung into engagement with the proximate stop.

Motion originates from the tray 98 in response to an effective gravity force resulting from the accumulating weight of the milk fluid discharged from the tube 90 alternately into the two compartments of the tray, thereby causing first one of them and then the other to be swung to a down position where the liquid load is free for gravity discharge over and out of the open end of the compartment. The gravity-induced impulse thereby generated is transmitted through the link 102 to the counter mechanism for concurrent operation thereof. The two spaced stops 109 between which the arm 110 is free to oscillate establish limits for the movement range of the link 102 and for the arms 100 and 103, including also the interconnected counter mechanism and the rocking tray. The two magnets 112 act to modify the operating movements of these several parts which, in the case of the tray in particular, is an important ingredient in accurately measuring the amount of fluid passing through the conduit system therefor.

Filling of each tray compartment proceeds through two stages. It is to be noted that the milk flow is not strictly continuous. It may be somewhat irregular, and it is always variable as to velocity and volume. Furthermore, neither tray is ever completely filled—there should always be some unoccupied space remaining as a safety factor to prevent spill-over.

In the first stage the tray remains motionless. The milk received into the tray during this stage is a predetermined amount regardless of variations in its flow. The amount so received during the first stage is predetermined by its weight—enough accumulation to overcome (1) gravity and also (2) the adjustable force of magnetic holdback. This stage comes to an end quickly when rocking movement of the tray starts up.

The second stage coincides with the period of tray rocking movement, about 18 degrees or so. During this second stage the milk received into the tray is not a predetermined amount. It varies as the flow of incoming milk varies. This is known as the flow rate effect. If the fluid is to be gravimetrically weighed with any high degree of accuracy, the duration of this second stage must be kept very short. This may well be illustrated by the following examples:

Assume the weight of accumulated milk in the first stage to be about 3.86 oz., and .14 oz. to be added thereafter in the second stage, with a flow rate of 4# per minute. The accuracy of weight determination may then be as high as 99½%. But suppose the flow rate be but 2# per minute, then the weight determination will be perhaps 1½% high;

and if the flow rate be 8# per minute, the weight determination will be low by 1½% or so. For the weighing of milk whose flow, while variable, is always volumetrically small, the present method is acceptable and has been approved by the dairy industry. It utilizes an initial stage for accumulating milk in a predetermined amount, and a concluding stage, as short as possible, to minimize variations in the amount of milk accumulating therein.

The force exerted by each magnet 112 is of relatively short range. It is effective to hold the tray against movement from its starting position until after the weight of the milk accumulated therein is more than enough for a gravity-induced operation thereof. This excess of weight over that required for gravity-induced operation is subject to adjustment according to the width of the air gap separating the magnet arm 110 from the proximate magnet. Once started on its rocking movement, the tray proceeds substantially free of any magnetic influence until close to the opposite magnet. Its movement ends suddenly when the magnet arm 110 engages the fixed stop 109 toward which it is advancing. When so engaged, it still remains free of contact with the proximate magnet, yet close enough to be subject to its holding force until, in the next cycle of operation, the continuing flow of milk into the opposite tray compartment has accumulated sufficient weight to overcome this holding force so that a gravity-induced rocking movement of the tray may take place in the opposite direction.

The sudden stop of the tray at each end of its movement creates a catapulting force tending to discharge the liquid load speedily and completely out through the open end of the tray compartment then in down position. The tray mounting which assures shifting of its center of gravity from one side of its axis of movement to the other, plus the two spaced magnets 112, acting through the linkage connecting with the tray 98, exercise a close control over the tray's rocking movements, modifying the same (1) to shorten the duration of each such movement, and (2) to accelerate its rate of movement. When this accelerated movement is suddenly stopped, the catapulting force thereby generated contributes to a fast and complete discharge of the liquid load from the down compartment of the tray. Any objectionable flow rate effect is thereby minimized so that the counter mechanism is enabled to register substantially accurately the amount of accumulating fluid theretofore passed through the conduit system therefor.

With some such output computing device as that just described, the feed delivery mechanism of this invention may be advantageously employed, the purpose being to utilize the cow's milk yield itself as the basis for regulating the amount of feed to be delivered to the cow concurrently with the milking operation. By linking the operation of feed delivery to the cow concurrently and in direct proportion to her milk production while in the milking stall, an ideal interrelationship is achieved. Provision is also made for operation of the feed delivery mechanism when pail milking is performed, by employment of special controls for that purpose, as will shortly appear.

*The Impulse Switch*

The means whereby milk output controls delivery of feed to the cow starts with an impulse switch, which, as shown, comprises an elongated capsule 115 (see FIGS. 10 and 11) into which is axially extended from opposite ends a pair of electrodes 116 and 117 electrically connected exteriorly of the capsule to flexible wires $a$ and $b$, respectively, forming part of a low voltage circuit. The proximate ends of these electrodes remain spaced slightly apart, but the gap therebetween may readily be closed, but only momentarily, by a ball of mercury 120 when executing a rolling movement between the two ends of the capsule consequent upon the latter being rocked to lower one of its ends below the other. This ball surrounds both electrodes completely at the moment of its spanning the gap between them to close the circuit. To operate the impulse switch (see FIG. 9), rocking movements in opposite directions are imparted to the capsule 115 by an oscillatable arm 121 pivotally mounted at 122 and joined pivotally at one end to a link 125 in connection at 126 with the oscillatable magnet arm 110. The capsule is fixedly secured to the arm 121 at its upper end portion so that, with each oscillation thereof, a rocking movement is imparted to the switch whereby the capsule end which is down is raised to an up position, and vice versa, the mercury ball 120 being gravity impelled with each such rocking movement to roll to the down end of the capsule and, in so doing, to momentarily span the gap between the electrodes 116 and 117 to close the circuit between them, but only for a very brief instant of time.

*The Electrical System*

The power pack also contains the major portions of an electrical system wherein is a main circuit (carrying a high voltage current of perhaps 115 volts) and a control circuit (having a low voltage current of perhaps 12 volts), the latter including the impulse (mercury) switch I with connecting wires $a$ and $b$ already described. The wire $b$ is joined to one side of a double pole relay $c$ from whose opposite side a wire $d$ leads to one pole on the low side of a transformer $e$. Another wire $f$, leading from the other pole on the low side of the transformer, is in connection with the normally-closed micro switch 85 to which the wire $a$ is also connected, thereby completing the control circuit. A double pole switch $h$, interposed in the wires $a$ and $b$, is also connected with wires $i$ and $j$ leading to opposite poles of a normally open time switch $k$ and effective, when establishing a circuit with the latter, to substitute the time switch for the impulse switch I in energizing the relay $c$ and circuit wherein the micro switch 85 is placed.

The high voltage circuit starts with wires $m$ and $n$ connecting the high side of the transformer $e$ with a suitable current source. A wire $o$ connecting with the main circuit wire $m$ leads to one pole of the motor M whose opposite pole, through the wire $p$, is connected with one pole $q$ of the main circuit in the relay double pole switch; the pole $r$ opposite thereto, through the wire $s$, is connected with the main circuit wire $n$. The low voltage wire $a$ is in connection with one pole $t$ in the relay double pole switch, the pole $u$ opposite thereto being connected with the low voltage wire $b$ to complete the control circuit.

The high voltage circuit, operating through the wires $o$, $p$ and $s$, is effective to energize the motor M for operation once the double pole relay $c$, controlled by the low voltage circuit, is energized to carry current between the poles $q$ and $r$. The arrangement is such that, when the impulse switch I (or the time switch $k$) is operated, the control circuit is closed (momentarily, or for a pre-set interval or time) to energize the relay $c$, thereby to close the control circuit which thereupon holds the relay closed until the control circuit is again interrupted by opening of the micro switch 85. The motor M is then set in operation to rotate the disc 62 through 360 degrees. Just before the disc completes its revolution, the micro switch is tripped to open position, as by engagement from the boss 84 on the link 67 in the drive to the delivery wheel W, thereby bringing all motion to a halt and completing the cycle of operation. Wires $g$ and $v$ leading from the light 18 to the control circuit, the latter at the wire $a$, are effective for energization of the light, but only when the power pack is in operation, thereby serving to apprise an attendant of that fact.

*Typical Installation*

In operating the present feed mechanism some of the unusual conditions encountered, and the means provided to cope with them, may best be understood by considering a typical installation in a milking parlor. Among other factors to be reckoned with are the cow's milk production and rate thereof, and the ratio of such production to the feed consumed. While there is some variation in these figures, an average for a normal cow may be taken for purposes of illustration here.

A production of 23 lbs. would be normal. The flow through the milk line 90 is periodically interrupted by the rocking tray 98 from which the milk is dumped in increments of about ¼ lb. each, to the number of about 92 per milking. This is at the rate of about 4 lbs. per minute. The dumping of each ¼ lb. from the rocking tray generates an impulse which initiates a concurrent delivery of feed to the cow in an amount which is proper and best for her maintenance in good milk-producing condition. What amount is proper can be determined by individual tests in conjunction with known statistics based upon scientific tests. A simple dial may indicate the proper setting to meet all conditions, such as variations in feed density, time of year, pasturage, available feeds, etc. Such a dial may comprise the adjustable pointer 16 by which to fix the amount of feed which will be advanced by the delivery wheel with each operation thereof. Setting of this pointer controls the constant ratio of feed to milk production. In this way, a cow producing, say, 40 lbs. of milk will deservedly receive approximately twice as much feed as one producing half that amount.

The feed delivery wheel W, as shown, is provided with six compartments, each angled at 60 degrees and with capacity for about 2 ozs. of feed. Its maximum rotative movement is 60 degrees in response to an upward maximum stroke of the link 67. By different settings of the ratio cam R through manipulations of the pointer 16, this stroke is variable downwardly from full stroke to nearly zero. This assures an infinitely variable ratio of feed delivery per increment of milk dumped from the rocking tray 98, through a range equaling approximately a 2:1 to 8:1 ratio of milk production to feed. Control of the amount of feed delivered concurrently to the producing cow is attained by use of an electrical system, such as that herein disclosed, which is periodically energized in response to impulses consequent upon advance of uniform increments of milk through the conduit system therefor. Advances of feed, in uniform increments corresponding in number to those of the milk, also take place concurrently, but the amount of feed so delivered is variable according to the setting of the ratio cam R.

Discharge of feed from the wheel compartment which it occupies may require a rotative movement of the wheel through a substantial distance, otherwise its advance will be short of that needed for gravity discharge of the feed therefrom. If the ratio cam setting be such that the wheel rotates but, say, 15 degrees each time, then several successive cyclic operations will be needed before gravity discharge of feed can take place. While there may be wide variations in the uniform amounts of feed delivered with each cyclic operation, the total amount at the end of the milk production period can be accurately predetermined by the setting given to the ratio cam R.

For pail milking, the switch $h$ is operated to substitute the time switch $k$ for the impulse switch I as the closing medium in the control circuit of the electrical system. When so used, the time switch is set to remain closed for a desired period of time during which the motor M will continue to operate, thereby causing the driving mechanism and delivery wheel W to execute successively a number of cyclic movements which terminate only when the time switch opens itself at the end of the period for which it was set. The dial of the time switch may, if desired, be calibrated in terms of pounds of feed to be advanced by the delivery wheel. By relating the time switch setting to the milk production anticipated, or that weighed on the last test day, the amount of feed then to be delivered will be in the desired ratio thereto.

The present invention utilizes effectively the gravity-induced impulses which are generated by the tray 98 in response to each imbalance-shifting and magnet-controlled rocking movement thereof. Each such impulse may be transmitted mechanically, electrically or otherwise. As herein shown, the link 102 provides a mechanical means interconnecting the tray and counter mechanism, and this same link, plus the impulse switch I and electro-mechanical system already described, interconnects the tray and feed delivery mechanism for controlled operation of the latter. By this arrangement, concurrent operation of the tray, counter and feed mechanisms are assured, but with provision for regulating operation of the latter to deliver feed in an amount which is selectively proportionate to that of the fluid material whose conversion into separated increments is the source of power impulses linking these several mechanisms together for interrelated operations in the manner herein disclosed.

I claim:

1. In a conduit feeding system, the combination of a chute for containing loose feeding material passing therethrough to a discharge opening, a compartmented delivery wheel within the chute for receiving material into one or more of its compartments to be conveyed thereby toward the discharge opening, electric circuitry connected with a source of energy a motor in electrical connection with said source of energy and in driving connection with the delivery wheel, the driving connection comprising a ratchet mechanism for imparting a step by step rotative movement to the wheel, a reciprocable link operatively connected with the ratchet mechanism and effective during one of its strokes to operate the ratchet mechanism, means for varying the effective length of each stroke of the link whereby to determine the extent of rotative movement imparted by the ratchet mechanism to the delivery wheel, and a switch in the electrical circuitry engageable by the driving connection to be operated thereby to open position when the link has reached a predetermined point in its two-stroke cycle of operation, thereby to terminate the operating cycle.

2. A conduit feeding system according to claim 1 in which the means for varying the effective length of each stroke of the link comprises, in connection with the ratchet mechanism, a rotatable cam having a working face of progressively increasing radius from the axis of cam movement whereby to produce a wide range of variations in the effective length of the link stroke.

3. Means for feeding loose material through a chute having a throat adjacent a discharge opening comprising a compartmented wheel rotatably mounted within the throat for receiving in one or more of its compartments material to be conveyed toward the chute opening for discharge therefrom, a motor exteriorly of the chute, ratchet mechanism exteriorly of the chute, a drive means operatively connecting the motor with the ratchet mechanism for operation of the latter, and means operatively connected with the ratchet mechanism and adjustable during operation of said means, for varying the extent of operating movements of the latter whereby to produce a corresponding variation in the extent of driving movement imparted to the compartmented delivery wheel.

4. Means according to claim 3 wherein an electric circuit having a normally closed switch therein connects with the motor to supply current thereto, and means is provided in said drive means, engageable with the switch, to open the same at a predetermined point in the operating cycle of said drive means, thereby to stop the motor and terminate the operating cycle.

5. Means for feeding loose material from a chute having a throat and a discharge opening, comprising a compartmented delivery wheel occupying the throat and mounted for rotation therein to receive in one or more of its compartments material to be conveyed thereby for delivery therefrom and discharge through the chute opening, a motor mounted exteriorly of the chute, a drive connection between the motor and the delivery wheel for rotation of the latter, a housing surrounding the motor and drive connection, means incorporated in the drive connection for varying infinitely within a wide range the extent of movement transmitted to the delivery wheel whereby to vary correspondingly the extent of rotation imparted thereto, and control means exteriorly of the housing in operative connection with the means interiorly thereof and adjustable at will during its operation for varying the extent of each such wheel movement.

6. Means according to claim 5 wherein current is supplied to the motor for operation thereof, and wherein means operable by the drive connection is provided to shut off the current to stop the motor prior to completion of rotation of the delivery wheel through a distance equal to the spacing between two adjacent compartments therein.

7. Means for advancing loose material through a conduit in which a feeder, mounted for movement in a fixed path within the conduit, is operable in cycles to processionally move uniform increments of the material sequentially therein, a power pack for operating the feeder comprising a motor in circuit with a current source to be energized thereby, a drive between the motor and feeder having therein two reciprocable elements yieldingly interconnected, and means providing an adjustable stop for one of said elements whereby to vary its effective stroke to produce a corresponding variation in the extent of movement of the feeder, and a switch in the circuit operable to open position by an element of said drive thereby to stop the motor and terminate the operating cycle of the feeder.

8. Means for advancing loose material through a conduit system in which a feeder is mounted for rotation and operable in successive cycles to processionally move the material in separated increments, comprising a ratchet wheel in driving connection with the feeder, a carrier member pivotally mounted coaxially of the ratchet wheel, means on said carrier member operatively coupled to said ratchet wheel to impart to the ratchet wheel a step by step movement in response to oscillations of the carrier member, a motor, a drive extending from the motor to the ratchet wheel including eccentric means in yielding connection with a reciprocable link and a pivotal connection between the link and said carrier member for imparting oscillations to the latter, and a rotatably mounted cam provided with a working face of progressively increasing radius in engagement with the carrier member and forming an adjustable stop for the member to limit its oscillating movements in one direction, the cam, when rotated to different positions, acting to vary its stop position relative to the carrier member, thereby varying the extent of rotative movement imparted to the ratchet wheel and feeder driven thereby.

9. The new combination of a milk conduit system originating with a producing cow, wherein said system includes a two-way movable means operating to convert a stream of milk flowing in a variable amount into processionally advancing uniform increments thereof, and a second conduit system wherein is a feeder operable to intermittently advance feed therethrough for consumption by the cow concurrently with her production of milk entering into the conduit system therefor, a motor in driving connection with the feeder for operation thereof, an electrical system having control and main circuits, the latter circuit having the motor therein, an impulse switch in the control circuit, an operative coupling between the impulse switch and the said two-way movable means in the conduit system whereby said switch is actuated by said means in response to each movement of the latter to momentarily close the control circuit, a relay in the control circuit having an associated switch in the main circuit for operation to closed position in response to momentary closing of the control circuit, thereby to energize the motor for operation, a normally closed switch in the control circuit, and means in the driving connection from the motor operable during movement thereof to open the normally closed switch thereby to deenergize the control circuit and terminate the operating cycle of the motor and feeder.

10. A second circuit system according to claim 9 wherein the driving connection comprises a two-way movable element yieldingly connected to a second element to impart a like motion thereto, and an adjustable stop is engageable with one of these elements to vary its effective stroke to produce a corresponding variation in the extent of feeder movement whereby the total amount of feed advanced thereby is selectively proportioned to the variable amount of milk yielded by the producing cow.

11. As a new combination, a first conduit system through which uniform increments of milk are processionally advanced, pivoted supporting means responsive to movement of each milk increment to be oscillated thereby, a second conduit system through which uniform increments of feed are processionally advanced, feeding means for successively advancing all increments of feed through the second conduit system, an electrical system having a main circuit in connection with a current source, a power means in said main circuit for operating the feeding means, a control circuit wherein is a normally open impulse switch and a relay in connection with the main circuit, and means connecting the impulse switch to the pivoted supporting means to be operated by the latter to momentarily close the control circuit with each movement of a milk increment in the conduit system therefor, whereby the power means is energized for operation of the feeding means.

12. Conduit and electrical systems according to claim 11 wherein the impulse switch is an elongated capsule with electrodes axially extended thereinto from opposite ends thereof, proximate ends of the electrodes being spaced apart to provide a gap therebetween, the capsule being movable with the pivoted supporting means to be rocked thereby, and a mercury ball is confined within the capsule with freedom for gravity movement toward either end thereof when rocked to down position and, while so moving, acting to span the gap between the spaced ends of the electrodes to momentarily close the control circuit therethrough.

13. Conduit and electrical systems according to claim 11 wherein the impulse switch is an elongated capsule with electrodes axially extended thereinto from opposite ends thereof, proximate ends of the electrodes being spaced apart to provide a gap therebetween, the capsule being movable with the pivoted supporting means to be rocked thereby, and a mercury ball is confined within the capsule in surrounding relation to one or the other electrode therein, with freedom for gravity movement toward either end of the capsule when rocked to down-position and, while so moving, acting to span the gap between the spaced electrodes while momentarily surrounding both of them to close briely the control circuit therethrough.

14. Conduit and electrical systems according to claim 11 wherein a time switch is connected into the control circuit with an interposed double pole switch, the arrangement being such that the double pole switch is operable to disconnect the impulse switch therefrom when completing the circuit through the time switch, and vice versa, thereby to energize the main circuit either automatically through the impulse switch or manually through the time switch.

15. Conduit and electrical systems according to claim 11 wherein a variable drive is interposed between the power means and the feeding means, operable to vary the total amount of feed advanced thereby during successive operations thereof.

16. The combination with a first conduit system wherein a variable amount of fluid material is advanced intermittently in uniform increments, of a second conduit system wherein other fluid material is adapted for advance therethrough, feeding means in the second system for advancing intermittently therein variable amounts of the fluid material in uniform increments, and power means, operable responsively to each increment of material flowing through the first system, for imparting motion to the feeding means in the second system whereby to advance the material therein in uniform increments totaling an amount that is selectively proportionate to that passing through the first system.

17. The new combination of a milk conduit system, originating with a producing cow, wherein said system includes a movable means for receiving milk flowing in a variable stream therethrough and converting such stream into uniform increments thereof for processional advance therethrough, and a feed conduit system in which a feeder, mounted for movement in a fixed path and having operating means therefor, is operable in successive cycles to processionally advance variable amounts of feed therethrough in uniform increments, and means responsive to movement of said movable means in its conversion of the stream into each increment of milk within its conduit system to produce a cyclic operation of the feeder operating means whereby to advance an increment of the feed within the conduit system therefor.

18. A feed conduit system according to claim 17 having means to vary the amount of feed in each increment thereof whereby the total amount of feed advanced thereby is selectively proportionate to the total amount of milk passing through its conduit system.

19. The method of supplying feed to a producing cow in an amount proportionate to her concurrent yield which comprises the steps of flowing her milk from the point of origin through a conduit system to a point of destination, of flowing feed from a supply source through a second conduit system to a point adjacent the cow for her concurrent consumption, of converting the milk stream, while passing through the conduit system therefor, into a succession of processionally advancing uniform increments, of effecting generation of a power impulse at each point of conversion of the milk stream into an increment, of converting the feed, while passing through the conduit system therefor, into a succession of processionally advancing uniform increments, and of transmitting each power impulse generated in the milk conduit system to operating mechanism for the feed conduit system for synchronizing the conversions into increments of the material passing through the two systems whereby the number of increments of milk and of feed passing through the two systems will be the same.

20. The method of co-relating intermittent operation of a feeding mechanism for fluid material to be moved through a second conduit system with movement of an advancing fluid stream passing through a first conduit system, comprising (1) utilization of a gravity force to (a) convert the continuous stream in the first system into a succession of spaced, processionally advancing, equal fluid increments and (b) concurrently lower each such increment bodily at its point of conversion thereby to generate a power impulse, and (2) transmission of each such power impulse to the feeding mechanism for the fluid material in the second system to initiate concurrent intermittent operation thereof.

21. Apparatus for delivering to a milk producing cow an amount of feed directly proportionate to her output of milk, which apparatus comprises the combination with a pivotally supported gravity oscillated weighing tray having two compartments for alternately receiving milk directly from the producing cow, said tray compartments alternately dumping under gravitational action equal volumes by weight of milk as it is received, a feed delivering system including a feed supply means including a conduit for delivering feed to a cow for consumption concurrently with her delivery of milk to the weighing tray, rotary means forming a part of said supply means and constructed to pass into the conduit a predetermined quantity of feed upon a predetermined degree of rotation, an electrical system having a control circuit and a main circuit, an electric motor in the main circuit, a driving coupling between said motor and said rotary means and including therein a crank driven pawl and ratchet mechanism, an oscillatable switch in said control circuit, a linkage coupling between said tray and said switch whereby said control circuit will be closed and opened in coordination with the alternate filling and dumping of the tray compartments as the tray oscillates, and means actuated by and after a predetermined period of operation of said driving coupling to open the control circuit.

22. The invention according to claim 21, wherein said last stated means comprises a micro-switch in the control circuit and a reciprocable link forming an element of said crank driven pawl and ratchet mechanism and engageable with the micro-switch after the said predetermined period of operation of the driving coupling to open the latter switch.

23. The invention according to claim 21 wherein the ratchet component of said pawl and ratchet mechanism is coaxially coupled with said rotary means and wherein the pawl component of said pawl and ratchet mechanism is carried by an oscillatably supported arm, and there is an adjustable cam element engaging said support arm for controlling the throw of the latter and the consequent degree of rotation of the said ratchet component and the said rotary means with which it is coupled.

24. Means for advancing loose material through a conduit system comprising in combination with a feeder wheel mounted for rotation in successive cycles to processionally move the material in separated increments, a ratchet wheel in driving connection with the feeder wheel, a pawl carrier, means suspending said pawl carrier for oscillation coaxially of the ratchet wheel, pawl means on said pawl carrier in driving engagement with the ratchet wheel for imparting a step-by-step movement to the ratchet wheel on oscillation of the carrier, a motor having a shaft, an eccentric crank pin carried by said shaft, a link connected at one end with said pawl carrier eccentrically of the center of oscillation of the carrier, said link having a longitudinal slot therein adjacent to its other end and in which said crank pin is engaged and whereby rotation of the crank pin will impart longitudinal movement in one direction only to the link, said longitudinal slot permitting limited longitudinal movement of the link on and with respect to the crank pin, means connected to the link for urging longitudinal movement of the latter in the opposite direction, and means engageable with said pawl carrier for changing the extent of swing of the latter under the action of the crank pin and link coupled thereto, to thereby change the degree of rotation imparted by the pawl to the ratchet and feed wheels.

25. The invention according to claim 24 wherein the last stated means comprises a cam element supported for turning and for adjustment about an axis parallel to the turning axis of the pawl carrier and said cam having a camming face engageable with the pawl carrier for effecting manual adjustment turning of the pawl carrier and longitudinal movement of the link relative to the crank pin.

References Cited in the file of this patent

UNITED STATES PATENTS

| | | |
|---|---|---|
| 2,532,698 | Corkins | Dec. 5, 1950 |
| 2,661,122 | Peterson | Dec. 1, 1953 |
| 2,869,638 | Sullivan | Jan. 20, 1959 |
| 2,886,000 | Clegg | May 12, 1959 |
| 2,940,639 | Winter | June 14, 1960 |